United States Patent
Karnjate et al.

(10) Patent No.: US 7,634,345 B2
(45) Date of Patent: Dec. 15, 2009

(54) METHOD AND SYSTEM FOR DETERMINING BRAKING TORQUE IN AN ELECTRONIC BRAKING SYSTEM

(75) Inventors: Timothy M. Karnjate, Grand Blanc, MI (US); Kevin S. Kidston, New Hudson, MI (US); William K. Manosh, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 631 days.

(21) Appl. No.: 11/425,728

(22) Filed: Jun. 22, 2006

(65) Prior Publication Data

US 2007/0299593 A1 Dec. 27, 2007

(51) Int. Cl.
- *B60T 8/17* (2006.01)
- *B60T 8/172* (2006.01)
- *G06F 19/00* (2006.01)

(52) U.S. Cl. .......................... 701/70; 303/155; 303/189

(58) Field of Classification Search .................. None
See application file for complete search history.

(56) References Cited

U.S. PATENT DOCUMENTS

| | | | |
|---|---|---|---|
| 5,230,549 A | | 7/1993 | Osada et al. |
| 5,779,329 A | * | 7/1998 | Takeshima .................. 303/155 |
| 6,099,086 A | * | 8/2000 | Feigel et al. ............. 303/113.4 |

* cited by examiner

*Primary Examiner*—Michael J. Zanelli

(57) ABSTRACT

A braking system includes a brake travel sensor configured to generate travel data indicative of the distance a brake pedal has been displaced and a brake pressure sensor configured to generate force data indicative of the amount of force applied to the brake pedal. The braking system also comprises a brake controller configured to determine a first torque request from the travel data and a second torque request from the force data. The brake controller is further configured to generate brake commands from the first torque request when the first torque request and the second torque request are below a transition flag.

19 Claims, 3 Drawing Sheets

METHOD AND SYSTEM FOR DETERMINING BRAKING TORQUE IN AN ELECTRONIC BRAKING SYSTEM

TECHNICAL FIELD

The present invention generally relates to the field of braking systems for vehicles and, more specifically, to a method and system for determining braking torque in an electronic braking system.

BACKGROUND OF THE INVENTION

In order to enhance an operator's driving experience and a vehicle's performance and safety, different types of electronic enhancements are being developed to assist or replicate automotive systems that were previously mechanical in nature. One such automotive system is the brake-by-wire system. In a brake-by-wire system, an operator's activation of the brake pedal is determined by one or more sensors. The data from the sensors is then used by a computer or processor to determine an appropriate braking force to apply to the brakes based on the operator's intent as measured by the sensors.

Several different types of brake-by-wire systems exist. In an electro-hydraulic braking system, the computer commands an electro-hydraulic actuator to apply hydraulic pressure to the brake calipers to stop the vehicle.

Another type of brake-by-wire system is an electromechanical braking system. In an electromechanical braking system, there are no hydraulics. Braking force is applied by an electronic caliper which utilizes a small motor to push the brake pads against the rotor to stop the vehicle.

Additionally, vehicles can incorporate combined systems such as electromechanical and electro-hydraulic systems. Also, hybrid cars can utilize a combination of friction braking, which can be electromechanical or electro-hydraulic, and regenerative braking, which is also a type of electronic braking.

One difficulty in brake-by-wire systems is controlling the braking system such that the operator receives proper feedback at the brake pedal and the operator's braking intent is reflected in the braking applied at the wheels.

Accordingly, it is desired to provide a method and system for determining braking torque in an electronic braking system. Furthermore, the desirable features and characteristics of the present invention will be apparent from the subsequent detailed description and the appended claims, taken in conjunction with the accompanying drawings and the foregoing technical field and background.

SUMMARY OF THE INVENTION

In one embodiment of the present invention, a braking system includes a brake travel sensor configured to generate travel data indicative of the distance a brake pedal has been displaced and a brake pressure sensor configured to generate force data indicative of the amount of force applied to the brake pedal. The braking system also comprises a brake controller configured to determine a first torque request from the travel data and a second torque request from the force data. The brake controller is further configured to generate brake commands from the first torque request when the first torque request and the second torque request are below a transition flag.

In another embodiment, a method of operating an electronic braking system comprising a first step of receiving brake pedal travel data and a second step of receiving brake pedal pressure data. Next, a first requested torque is determined from the brake pedal travel data. Then, a second requested torque is determined from the brake pedal pressure data. The first requested torque is used as an actual overall torque request if the first requested torque and the second requested torque are below a transition flag. The second requested torque is used as the actual overall torque request if the first requested torque and the second requested torque exceed the transition flag.

In yet another embodiment, a brake controller is disclosed. The brake controller includes a first input for receiving brake pedal travel data and a second input for receiving brake pedal pressure data. An operator-requested torque calculator is coupled to the first input and the second input. The operator-requested torque calculator is configured to calculate a first torque request from the brake pedal travel data and a second torque request from the brake pedal pressure data. The operator-requested torque calculator is further configured to select the first torque request as an overall actual torque request when the first torque request and the second torque request are below a transition flag and select the second torque request as the overall actual torque request when the first torque request and the second torque request exceed the transition flag.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
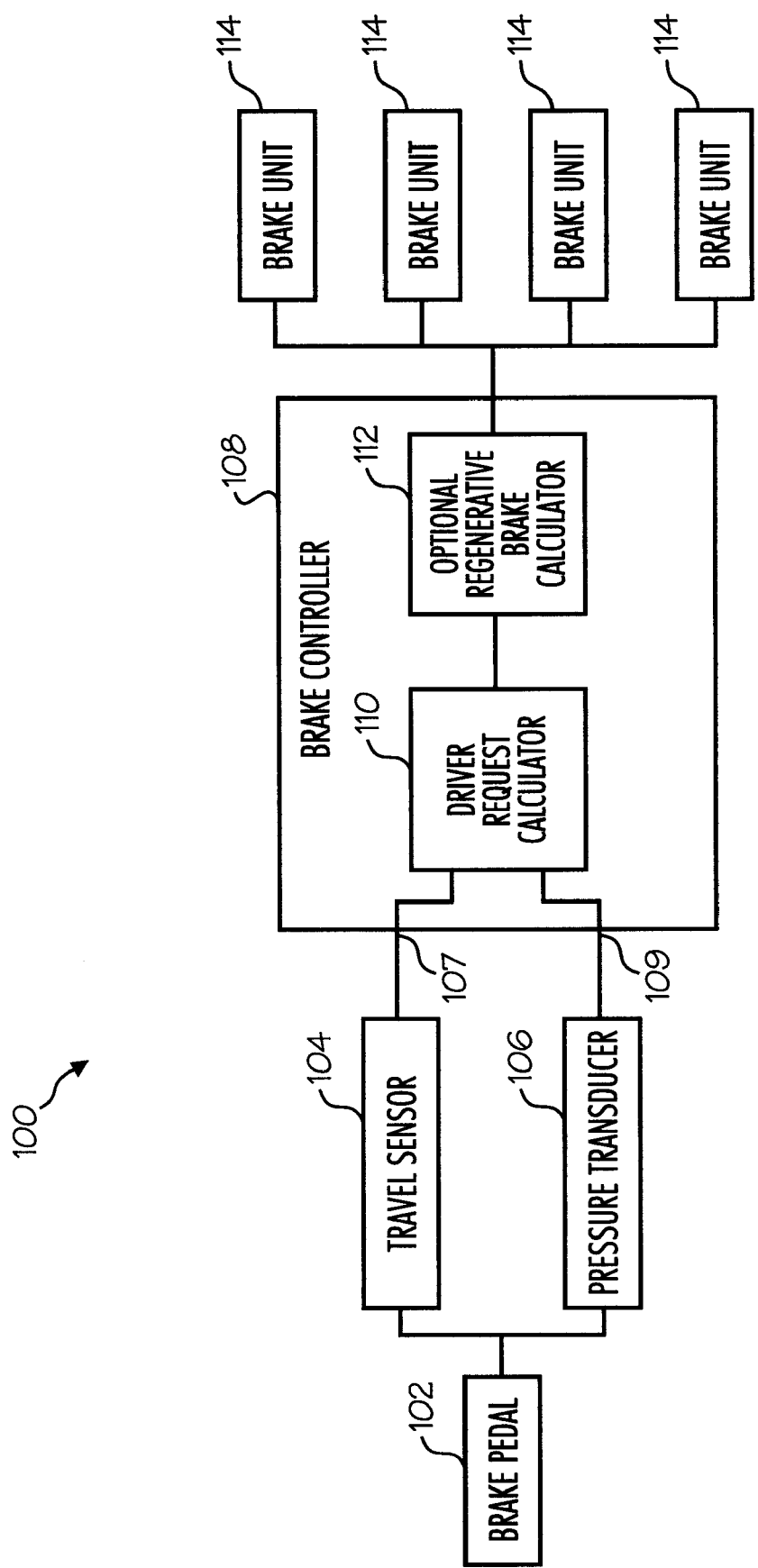
FIG. 1 is a block diagram of an exemplary brake-by-wire system in accordance with the teachings of the present invention.

FIG. 1 is a block diagram of an exemplary braking system 100 for use in a brake-by-wire system. Braking system 100 includes a brake pedal 102 coupled to a brake pedal travel sensor 104 and a brake pressure transducer 106. The brake pressure transducer 106 and the brake pedal travel sensor 104 are both coupled to a brake controller 108, which in turn couples to brake units 114.

Brake pedal 102 provides an interface between an operator and a brake system, such as braking system 100. To initiate the braking system 100, an operator would typically use their foot to depress the brake pedal 102. How far the pedal is depressed and how much force an operator applies to the brake pedal can be indicative of how rapidly the operator wishes to decelerate the vehicle.

Brake pedal travel sensor 104 provides an indication of how far the brake pedal has been depressed, which is also known as brake pedal travel. In one exemplary embodiment, brake pedal travel can be determined by how far an input rod in a brake master cylinder has moved. Other methods of measuring brake travel can also be utilized.

Brake pressure transducer 106 determines how much force the operator of braking system 100 is using to depress the brake pedal 102. This is also known as the brake force applied by the operator. In one exemplary embodiment, the brake force can be determined by measuring hydraulic pressure in the master cylinder of the braking system 100. Other methods of determining the amount of brake force can also be used.

Brake controller 108 receives a first input 107 from the pedal travel sensor 104 and a second input 109 from the pressure transducer 106 and determines an overall requested torque. The overall requested torque can then be used to determine braking commands to provide to the brake units 114. In one exemplary embodiment, brake controller 108 comprises an operator-requested torque calculator 110 and an optional regenerative brake calculator 112.

Operator-requested torque calculator 110 computes an overall requested braking torque based on sensors that measure an operator's braking intent, such as brake pressure transducer 106 and brake pedal travel sensor 104. The output from each of the sensors can be used to determine an operator's requested torque. For example, an operator's requested torque can be determined using only the output of the brake pressure transducer 106. Similarly, an operator's requested torque can be determined using only the output of the brake pedal travel sensor 104. Either one of these determinations of operator-requested torque could be used as the overall requested braking torque to be applied by the brake units 114. However, using only the output of the brake pedal travel sensor 104 to determine the overall requested torque to apply to the brake units 114 results in a very high force hysteresis in the brake system. If only the output of the brake pressure transducer 106 is used to determine the overall requested torque, large errors in brake commands produced by the brake controller 108 may occur when low levels of force are applied to the brake pressure transducer 106.

In one exemplary embodiment of the present invention, to provide an electronic braking system that simulates the feel of a purely mechanical braking system, brake torque is determined using both the output of the brake pressure transducer 106 and the brake pedal travel sensor 104. In this exemplary embodiment, the output of the brake pedal travel sensor 104 is used as an input to a first lookup table to determine a first torque request. The output of the brake pressure transducer 106 is used as an input to a second lookup table to determine a second torque request. Initially, the brake controller 108 determines a brake command for use by the brake units 114 based on the first torque request. Additionally, in one exemplary embodiment, the brake controller 108 compares the first torque request to the second torque request to determine when the difference between the two falls within a predefined value. Once the difference between the first torque request and the second torque request fall within the predefined value, the second torque request is used by the brake controller 108 to generate the brake command for use by the brake unit 114.

The predefined value can be adjusted and, in one exemplary embodiment, is selected to prevent any operator-discernable disruption to deceleration when switching between the first torque request and the second torque request. Also, the predefined value can be adjusted such that the transition between using the first torque request and the second torque request occurs at a point in the operation of the brake pressure transducer 106 that falls within its reliable operating range.

A transition flag can be set to correspond to when the predefined value is reached. When the first torque request and the second torque request are below the transition flag, the first torque request can be used by the brake controller 108. When the first torque request and the second torque request exceed the transition flag, the second torque request can be used by the brake controller 108.

Figure 2:
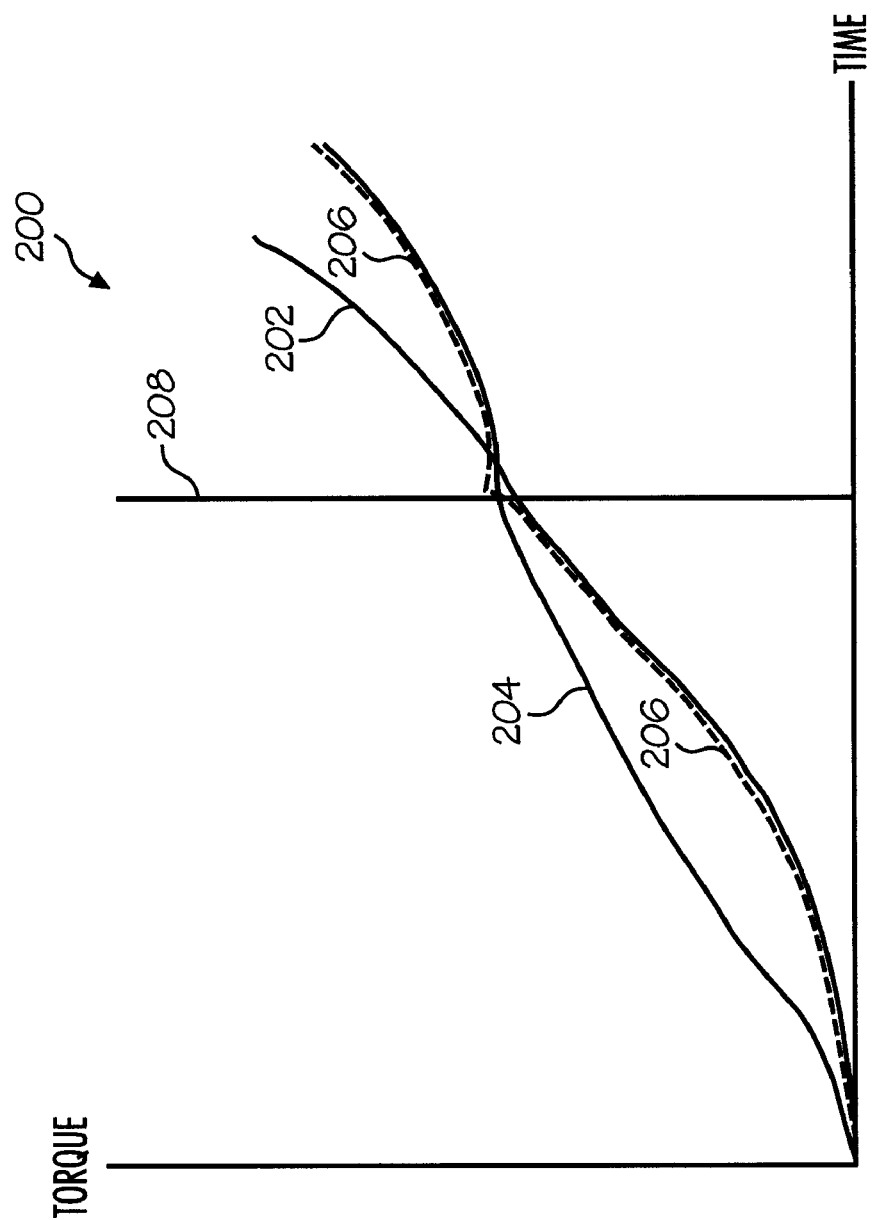
FIG. 2 is an exemplary graph of torque based on operator intent in accordance with the teachings of the present invention.

FIG. 2 illustrates a torque graph 200 depicting a first torque request 202 (travel based torque request) and a second torque request 204 (force based torque request). An actual torque request 206 represents the torque request used by the brake controller 108 to produce the brake commands. When the differences between the first torque request 202 and the second torque request 204 have not reached a predetermined value, the actual torque request 206, in one exemplary embodiment, is the first torque request 202. After the difference between the first torque request 202 and the second torque request 204 falls within the predetermined value, which is represented by a transition flag 208, the actual torque request 206, in one exemplary embodiment, is the second torque request 204.

As illustrated in FIG. 2, the actual torque request 206 is slightly offset from the first torque request 202 and the second torque request 204 for easy of viewing. As discussed previously, in one exemplary embodiment, the actual torque request 206 will coincide with the first torque request 202 and the second torque request 204 depending on where the transition flag 208 lies, However, the actual requested torque can be offset from but based on the first torque request 202 and the second torque request 204

In the exemplary embodiment as illustrating FIG. 2, pedal travel data is used to determine the actual torque request 206 for low deceleration levels. Further, transition flag 208 can be adjusted to switch the actual torque request 206 to the second torque request 204 when the data from the brake pressure transducer 106 is most accurate.

Turning back to FIG. 1, optional regenerative brake calculator 112 can compute the amount of torque to be provided by a regenerative braking system and the amount of torque to be provided by a friction braking system in a vehicle. A method and system for operating a regenerative and friction braking system is disclosed in U.S. Ser. No. 11/197,284, entitled "Method and System for Brake Distribution in a Regenerative Braking System," filed on Aug. 4, 2005 and assigned to GM Global Technology Operations, Inc., of Detroit, Mich., who is the assignee of the present invention.

Brake units 114 receive the torque requests, typically in the form of brake commands from brake controller 108. Brake units 114 can be any device or collection of devices that, upon receipt of brake commands, can apply the proper braking torque as received from the brake controller 108. For example, in an electro-hydraulic system, brake units 114 can comprise an actuator that can generate hydraulic pressure that can cause brake calipers to be applied to a brake disk to induce friction to stop a vehicle. Alternatively, in an electromechanical brake-by-wire system, the brake unit 114 can comprise a wheel torque generating device that operates as a vehicle brake. Brake units 114 can also be regenerative braking devices.

Figure 3:
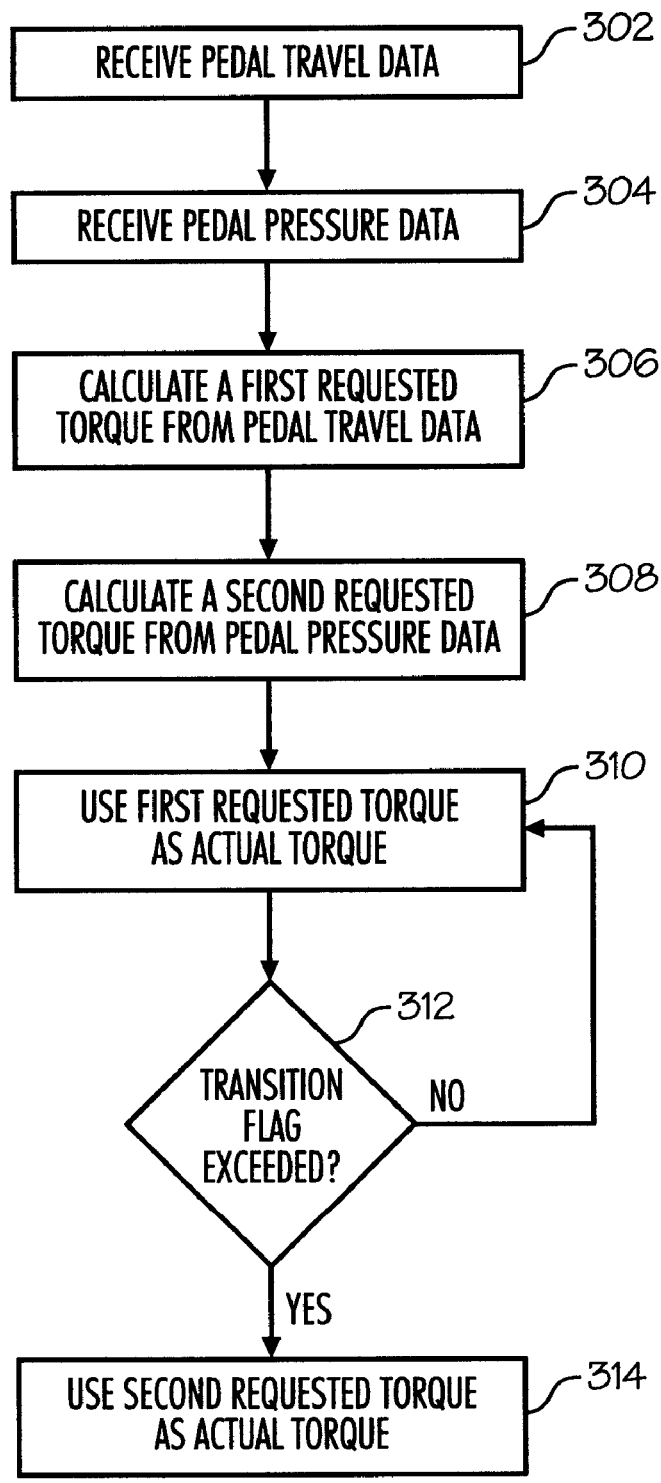
FIG. 3 is a flowchart illustrating a method of operating an electronic braking system in accordance with the teachings of the present invention.

FIG. 3 is a flowchart illustrating an exemplary method of operating an electronic braking system. In a first step, step 302, brake travel data is received at the brake controller 108. Next, in step 304, brake pressure data is received at the brake controller 108.

In step 306, a first requested torque is calculated from the pedal travel data. As discussed previously, in one exemplary embodiment, the first requested torque can be determined using the brake travel data as an input to a look-up table to determine the torque request. Other methods of determining torque from the brake travel data, such as using a mathematical relationship between torque and the brake travel data can also be used.

In step 308, a second requested torque is calculated from the pedal pressure data. As discussed previously, in one exemplary embodiment, the second requested torque can be determined using the pedal pressure data as an input to a look-up table to determine the torque request. Other methods of determining torque using the pedal pressure data, such as using a mathematical relationship between torque and the brake pressure data can also be used.

In step 310, the first requested torque is used as the actual requested torque to be applied by the brake units 114. In step 312, it is determined if the first requested torque and the second requested torque have reached a predetermined transition flag, based, in one exemplary embodiment, by a difference between the first requested torque and the second requested torque. If the first requested torque and the second requested torque have not reached the transition flag, then the first requested torque is used as the actual requested torque, in step 310.

If the first requested torque and the second requested torque are at or beyond the transition flag, the second requested torque is used as the actual requested torque, in step 314. While in the exemplary method as set forth in FIG. 3, the actual requested torque was set to be the same as either the first requested torque or the second requested torque, the actual requested torque can be calculated to but not exactly the same as the first requested torque and the second requested torque.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A braking system comprising:
    a brake travel sensor configured to generate travel data indicative of a distance a brake pedal has been displaced;
    a brake pressure sensor configured to generate force data indicative of the amount of force applied to the brake pedal; and
    a brake controller configured to determine a first torque request from the travel data and a second torque request from the force data, the brake controller further configured to generate brake commands from the first torque request when the first torque request and the second torque request are below a transition flag.

2. The braking system of claim 1 wherein the brake controller is further configured to generate brake commands from the second torque request when the first torque request and the second torque request exceed the transition flag.

3. The braking system of claim 1 further comprising a plurality of brake units coupled to the brake controller.

4. The braking system of claim 3 wherein two or more of the brake units are regenerative brake units.

5. The braking system of claim 1 wherein the brake controller is configured to receive the travel data and generate the first torque request using the travel data as an input to a look-up table relating travel data and requested torque.

6. The braking system of claim 1 wherein the brake controller is configured to receive the force data and generate the second torque request using the force data as an input to a look-up table relating force data and requested torque.

7. The braking system of claim 2 wherein the transition flag is set such that the brake commands generated from the second torque request occur in an optimal operating region of the brake pressure sensor.

8. The braking system of claim 4 wherein the brake controller further comprises a regenerative braking controller configured to determine a regenerative braking torque from the first torque request or the second torque request.

9. A method of applying an electronic braking system comprising:
    receiving brake pedal travel data;
    receiving brake pedal pressure data;
    determining a first requested torque from the brake pedal travel data;
    determining a second requested torque from the brake pedal pressure data;
    using the first requested torque as an actual overall torque request if the first requested torque and the second requested torque are below a transition flag; and
    using the second requested torque as the actual overall torque request if the first requested torque and the second requested torque exceed the transition flag.

10. The method of claim 9 wherein the step of determining a first requested torque from the brake pedal travel data further comprises using the brake pedal travel data as an input for a look-up table relating the brake pedal travel data to the first requested torque.

11. The method of claim 9 wherein the step of determining a second requested torque from the brake pedal pressure data further comprises using the brake pedal pressure data as an input for a look-up table relating the brake pedal pressure data to the second requested torque.

12. The method of claim 9 further comprising the steps of determining a regenerative braking torque from the actual overall torque request.

13. The method of claim 9 further comprising setting the transition flag based on an optimal operating range of a pedal pressure transducer.

14. The method of claim 9 further comprising receiving the actual overall torque commands at a plurality of electro-hydraulic brake units.

15. The method of claim 9 further comprising receiving the actual overall torque commands at a plurality of electro-mechanical brake units.

16. A brake controller comprising:
    a first input for receiving brake pedal travel data;
    a second input for receiving brake pedal pressure data; and
    an operator-requested torque calculator coupled to the first input and the second input, the operator-requested torque calculator configured to calculate a first torque request from the brake pedal travel data and a second torque request from the brake pedal pressure data, the torque calculator further configured to select the first torque request as an overall actual torque request when the first torque request and the second torque request are below a transition flag, the operator-requested torque calculator further configured to select the second torque request as the overall actual torque request when the first torque request and the second torque request exceed the transition flag; and an output coupled to a plurality of brake units, the brake units configured to receive the overall actual torque request.

17. The brake controller of claim 16 wherein the driver-requested torque calculator calculates the first torque request using the brake pedal travel data as an input to a look-up table relating the brake pedal travel data to a torque value.

18. The brake controller of claim 16 wherein the driver-requested torque calculator calculates the first torque request using the brake pedal force data as an input to a look-up table relating the brake pedal force data to a torque value.

19. The brake controller of claim 16 further comprising a regenerative brake calculator configured to determine a regenerative braking torque from the overall actual torque request.

* * * * *